Sept. 20, 1960        H. H. GÜNTHARD ET AL        2,953,727
GENERATING OF HOMOGENEOUS STATIC MAGNETIC FIELDS
Filed Feb. 5, 1958                      2 Sheets-Sheet 1

Difference from mean field strength in Milli-Gauss

Sept. 20, 1960   H. H. GÜNTHARD ET AL   2,953,727
GENERATING OF HOMOGENEOUS STATIC MAGNETIC FIELDS
Filed Feb. 5, 1958   2 Sheets-Sheet 2
Fig.4
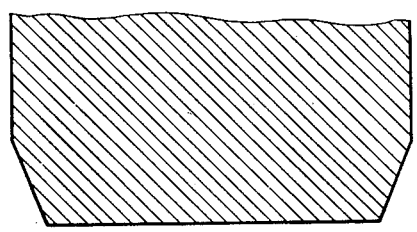
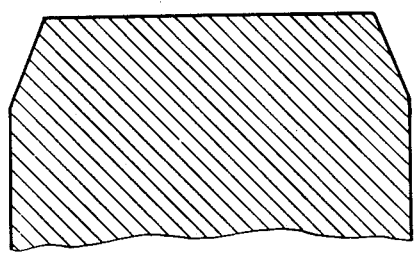
Fig.5
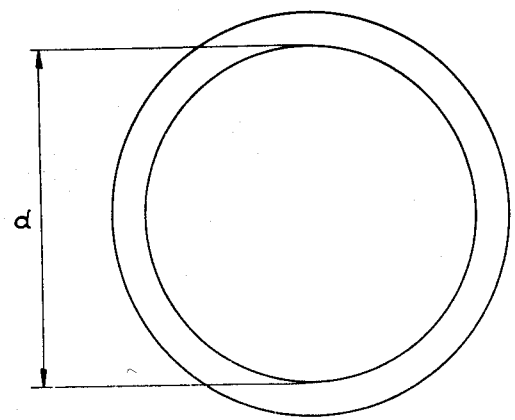
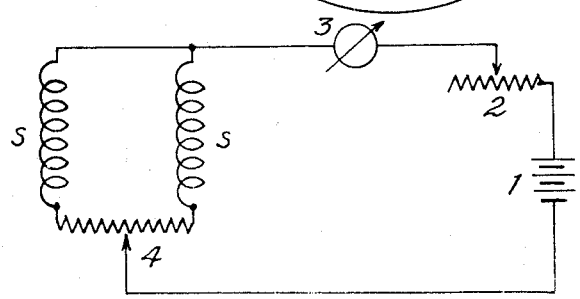
Fig.6.

United States Patent Office 2,953,727
Patented Sept. 20, 1960

2,953,727

GENERATING OF HOMOGENEOUS STATIC MAGNETIC FIELDS

Hans Heinrich Günthard and Johann Jaroslav Primas, Zurich, Switzerland, assignors to Trüb, Täuber & Co., A.G., Zurich, Switzerland Filed Feb. 5, 1958, Ser. No. 713,328

Claims priority, application Switzerland Apr. 12, 1957

3 Claims. (Cl. 317—123)

The present invention relates to the generating of homogeneous static magnetic fields.

For various purposes static magnetic fields are needed which in a certain predetermined range have a very great homogeneity. For example in nuclear induction tests, fields of a field strength between some relatively low Gauss and some $10^4$ Gauss are used wherein, in the range of the specimen, i.e. in a range between a cubic millimetre and a cubic centimetre, the differences from a mean field strength must not exceed the $10^{-5}$ to $10^{-8}$th of the mean value.

The homogeneity of the field in the centre of the air gap between two pole shoes of an electro or permanent magnet may be influenced within certain limits by the shape of the pole shoes. However, the attaining of the above values of homogeneity would require that the ratio between the diameter of the pole shoes and their spacing should become very large. Since, for experimental reasons, the spacing of the pole shoes must not in most cases be below a certain magnitude, the corresponding diameters of the pole shoes can not in general be realized, particularly not with permanent magnets. Even where realization were inherently possible, the total expense can be substantially reduced by correcting elements for the homogeneisation of the magnetic field in a certain small range, even in the case of an electro-magnet.

Accordingly homogeneities to the extent required are mostly attained in that with reasonable dimensions of the magnet, i.e. with ratios of the diameter of the pole shoes to the spacing thereof between 5 and 20, correcting elements are arranged within or adjacent the air gap, the influence of which homogeneities the magnetic field in a certain range around the centre of the air gap, at the expense of the range lying further outside, where the inhomogeneities are increased.

A known kind of such correcting elements, used for pole shoes having rotational symmetry, consists in coils through which passes an electric current, which are arranged in pairs symmetrically within or around the air gap between the pole shoes. It is evident that it is always possible by suitable choice of the currents to establish the conditons of homogeneity desired, provided the number of coils is chosen sufficiently large. Examples known from the literature use seven or more of such pairs of coils.

The present invention has the main object of providing a device which is substantially simpler and less expensive, and for most practical purposes permits a satisfactory homogeneity of the magnetic field to be attained with a single pair of correcting coils only.

With this and other objects in view we provide a device for generating a homogeneous static magnetic field, comprising in combination: a pair of parallel pole shoes, the diameter of the said pole shoes being large as compared with the distance between the same, a pair of electrically conductive coils arranged between the said pole shoes and substantially parallel thereto, each of the said coils substantially contacting the face of one of the said pole shoes and the mean radius of the said coils being substantially equal to 0.43 times the said distance between the said pole shoes, and an external source of direct current adapted to be electrically connected to the said coils. The intensity of the said current is adjusted so as to accurately compensate for inhomogeneities of the second order in the magnetic field between the said two pole shoes, and at the same time substantially to reduce inhomogeneities of the fourth order in the said field to zero.

These and other features and objects of our said invention will be clearly understood from the following description of an embodiment thereof given by way of example with reference to the accompanying drawing, in which:

Fig. 1 diagrammatically illustrates a device in section across the air gap two magnet poles, Fig. 2 is a graph in which the coefficients of inhomogeneity of various orders are plotted as ordinates over the ratio of coil diameter to width of air gap as abscissa.

Fig. 4 is a longitudinal section of two pole shoes.

Fig. 5 is a view from above on one of them, and

Fig. 6 is a diagrammatic illustration of the electric circuit of the invention showing an external source of direct current electrically connected to the coils in parallel and control means for adjusting the relative current intensities in the coils.

Figure 1:
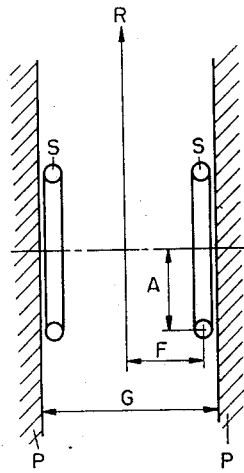

The device illustrated in Fig. 1 comprises two parallel pole shoes P, between which only two flat, electrically conductive correcting coils S are arranged. The pole shoes P belong to an electro or permanent magnet otherwise not shown, the magnetic circuit of which consists, apart of the air gap between the pole shoes P, of a material of very high magnetic permeability in which nowhere saturation prevails. The whole device is axially symmetrical with respect to the axis Z, and has a mirror plane for Z=0. The diameter of the pole shoes P is much larger than that of the correcting coils S, and the latter lie very closely adjacent the pole shoes P.

The spacing of the pole shoes be G, the radius of the correcting coils be A, and the distance of the correcting coils from the middle plane be $$F \leq \frac{G}{2}$$

In order to simplify the calculation all the lengths are to be expressed in units of A, all the fields in units of $$\frac{\mu_0 \cdot N \cdot I}{2A}$$

wherein N is the number of turns of a single correcting coil, I is the current flowing through this coil, and $\mu_0$ is the permeability of air. Assuming Z and R to constitute the cylindrical co-ordinates of this problem, one may define as the normed axial co-ordinate $$z = \frac{Z}{A}$$

normed radius vector $$r = \frac{R}{A}$$

normed pole shoe spacing $$g = \frac{G}{A}$$

normed coil spacing $$2f = \frac{2F}{A}$$

and normed field vector $$b = \frac{B \cdot 2A}{\mu_0 \cdot N \cdot I}$$

It is evident that all these normed values are dimensionless.

It can be proved that in the plane of $z=0$ the normed field vector $b$ may be calculated as follows:

$$b(r,z=0) = \frac{4\omega}{\pi} - 4\omega \sum_{n=1}^{\infty} \cos(2n\omega f) \cdot 2n\omega H_1^{(1)}(i2n\omega) \cdot J_0(i2n\omega r)$$

wherein $H_1^{(1)}$ is the first Hankel's function of the 1st order, and $J_0$ is the Bessel function of zero order. Moreover $\omega$ is defined as $$\frac{\pi}{g}$$

while $i = \sqrt{-1}$.

Numerical evaluation of this function shows that the correction is the more successful the nearer $$f = \frac{g}{2}$$

Although the point $$f = \frac{g}{2}$$

can never be accurately attained because of the presence of the pole shoes, the Equation 1 will now be evaluated for the sake of simple calculation for the special case $$f = \frac{g}{2}$$

and it will also be shown that under this assumption the compensation succeeds accurately up to and including inhomogeneities of the 4th order.

One thus obtains:

(2)

$$b(r,z=0) = \frac{4\omega}{\pi} - 4\omega \sum_{n=1}^{\infty} (-1)^h \cdot 2n\omega \cdot H_1^{(1)}(i2n\omega) \cdot J_0(i2n\omega r)$$

or developed in powers of $r$:

(3)

$$b(r,z=0) = \sum_{n=0}^{\infty} b_{2n} \cdot r^{2n} = b_0 + b_2 r^2 + b_4 r^4 + \ldots$$

wherein (4)

$$\begin{cases} b_0 = \frac{4\omega}{\pi} - 8\omega^2 \sum_{n=1}^{\infty} (-1)^n \cdot n H_1^{(1)}(i2n\omega) \\ b_2 = -8\omega^4 \sum_{n=1}^{\infty} (-1)^n \cdot n^3 H_1^{(1)}(i2n\omega) \\ b_4 = -2\omega^6 \sum_{n=1}^{\infty} (-1)^n \cdot n^5 \cdot H^{(1)}(i2n\omega) \end{cases}$$

Figure 2:
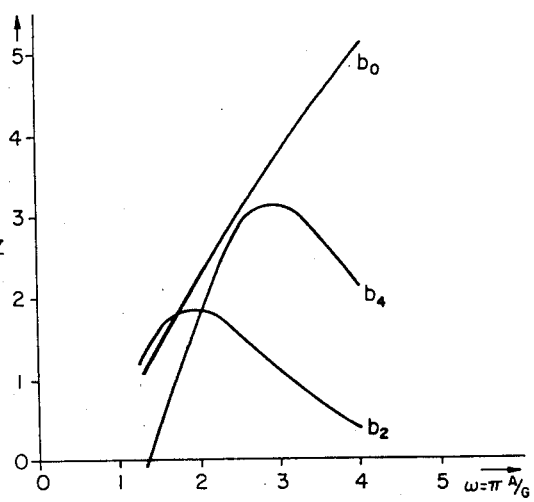

In Fig. 2 the course of the three co-efficients $b_0$, $b_2$ and $b_4$ is plotted as a function of $$\omega = \frac{\pi}{g} = \frac{\pi A}{G} \cdot b_4$$

has a zero point at $\omega = 1.35$, which means that the current passing through the correcting coils can be so chosen that the inhomogeneities of the second order ($b_2$) are accurately compensated for without introducing thereby an inhomogeneity of the fourth order ($b_4$).

Since with magnets having a ratio of pole shoe-spacing to -diameter $\leq 1:5$ the uncorrected magnetic field can be represented in a wide range by a field of the form (5) $\quad B(A, Z) = B_0 + B_2(R^2 - Z^2)$ wherein accordingly inhomogeneities of the fourth order do not occur, any inhomogeneity of the fourth order is abolished in the above case.

The necessary condition for this is only the fulfilment of $\omega = 1.35$ or $A = 0.430\ G$.

The co-efficients in (3) then become: $b_0 = +1.23$; $b_2 = +1.36$; $b_4 = 0$.

The current for the compensation of $B_2$ in (5) then becomes (6) $\quad I = \frac{2B_2 \cdot A^3}{N \cdot \mu_0 \cdot 1.36}$ With this compensation the field homogeneities demanded hereinabove are attainable. The use of more than one pair of correcting coils has a purpose then only when field inhomogeneities even of the 6th and higher orders have to be compensated for, which may be necessary in extremely rare cases only.

As stated hereinabove, the condition $$f = \frac{g}{2}$$

cannot be fulfilled accurately. It is approximated best, when the correcting coils directly contact the pole shoes of the magnet. Experimental vertification shows that with this approximation there occurs not yet any disturbing departing from the theoretical result. Likewise naturally for holding the coils yet a small distance between the coils and the pole shoes may be necessary. Also in this case the conditions for yet a good correction of the inhomogeneities are given, provided always that the distance between the coils and the pole shoes is small as compared with the mutual distance of the coils.

The correcting coils S accordingly lie at least approximately in contact with the pole shoes.

By magnetic saturisation at certain points of the pole shoes or owing to the fact that the diameters of the pole shoes are not sufficiently large as compared with the spacing of the pole shoes, small deviations from theory may likewise occur. The value of $\omega$ is thereby slightly altered, and accordingly also the ratio of $A = 0.430G$ may be somewhat modified. When on the other hand in the ideal case of $$f = \frac{g}{2}$$

the ratio $$\frac{A}{G}$$

departs even a little from the figure 0.430, the fourth order likewise does not exactly become zero when accurately compensating the second order; however it remains sufficiently small so that the requirements made on homogeneity are still fulfilled also in this case.

The correcting coils S accordingly have a radius A of accurately or approximately 0.430G. The mean radius of the packet of windings is understood to represent the radius of the coils.

The fact that the aforesaid approximations still yield a good result has been ascertained with a permanent magnet of a ratio of about 1:6 of the air gap to the diameter of the pole shoes. The correct proportions of the pole shoes are shown in Figures 4 and 5, the diameter $d$ being $= 150$ mm. and the magnet consisting of Armco-iron. In using this equipment the following conditions obtained: the correcting coils directly contacted with their coil body the pole shoes, but the coils had a distance therefrom amounting to the eightieth part of the distance between the coils. The field on the Z-axis amounted to about 6,000 Gauss. The coiled radii A were exactly $= 0.43G$ and slightly larger than 1 centimeter. The current in the correcting coil was so adjusted that the second order of inhomogeneity was exactly compensated for. According to the theory the fourth order then becomes zero.

Figure 3:
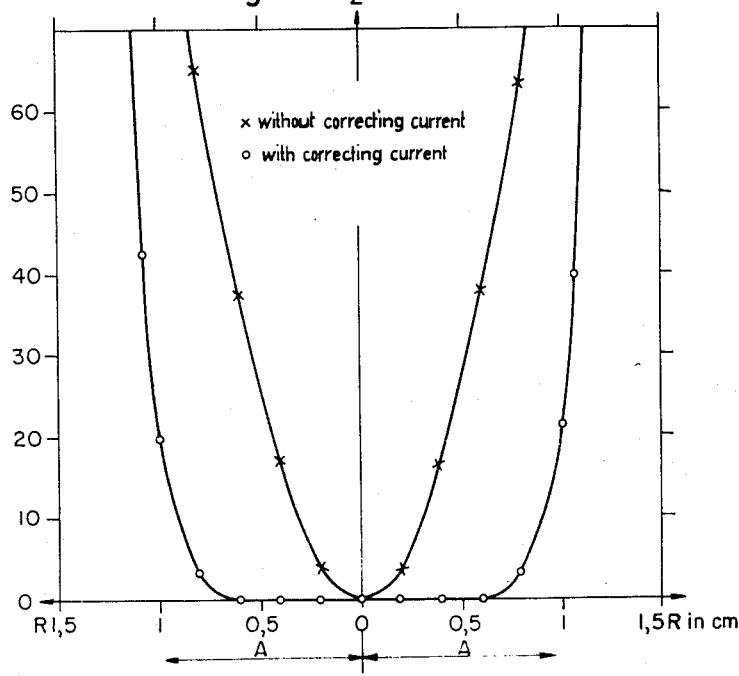
Fig. 3 is a graph plotting the differences of field strength from a mean value as ordinates over the radial distances from the centre of the field as abscissal.

Fig. 3 shows the result of these measurements, the difference of the field from the field strength on the Z-axis being plotted as a function of the radius R, viz. in milli-Gauss. The crosses denote measurements without current, the small circles on the other hand measurements with appropriately adjusted current in the correcting coil. The drawn graphs show the course calculated according to the above theory without and with ideal correcting coils, respectively. The measurements show that the approximate values for the correcting coils give sufficiently accurate results for the practice, without further consideration of saturation phenomena and of other corrections.

In the range $O<R<0.6$ cm. the field was practically absolutely homogeneous. The dimensioning indicated of the coils applies to electro-magnets having pole shoes as well as to permanent magnets, and naturally also to permanent magnets having an additional equally or oppositely directed coil field superimposed, provided the coils are so mounted on the pole shoes of the magnet that they do not generate an appreciable scattered field in the air gap.

By small differences in the production or in the centering of the correcting coils or by small errors in the pole shoes small disturbances of the mirror-symmetry of the field may be caused. The latter can be abolished wholly or to the greatest part in that the current intensity in the two coils is made slightly different from one another.

Fig. 6 illustrates an electric circuit for suitably energizing the correcting coils S, S in a manner which will be self-evident. Thus, there is shown an external source 1 of direct current in the form of a battery, a variable resistance 2 which may be adjusted to provide the coils with the current value defined in Equation 6 above, and an ammeter 3 which will register the current supplied to the coils S, S. Because the current from the external source passes through both coils in parallel, the ammeter 3 registers twice the current defined in Equation 6 when the variable resistance 2 is correctly adjusted. A variable resistance 4 connects two adjacent ends of the coils S, S; and, as will be apparent, this variable resistance may be adjusted to vary the relative currents through the two coils without disturbing the total current resulting from the setting of the variable resistance 2 and measured by the ammeter 3.

While we have described herein and illustrated in the accompanying drawings what may be considered a typical and particularly useful embodiment of our said invention, we wish it to be understood that we do not limit ourselves to the accurate details and dimensions described and illustrated, for obvious modifications will occur to a person skilled in the art.

What we claim as our invention and desire to secure by Letters Patent, is:

1. A device for generating a homogeneous static magnectic field, comprising in combination: a pair of parallel pole shoes, the diameter of the said pole shoes being large as compared with the distance between the same, a pair of electrically conductive coils arranged between the said pole shoes and substantially parallel thereto, each of the said coils substantially contacting the face of one of the said pole shoes and the mean radius of the said coils being substantially equal to 0.43 times the said distance between the said pole shoes, and an external source of direct current adapted to be electrically connected to the said coils.

2. A device as claimed in claim 1, wherein means are provided for adjusting the current intensity of the direct current passed from the said source through the said coils so as to accurately compensate for inhomogeneities of the second order in the magnetic field between the said two pole shoes, and at the same time substantially to reduce inhomogeneities of the fourth order in the said field to zero.

3. A device as claimed in claim 2, wherein the said two compensating coils are connected in parallel, and comprising control means adapted to adjust slightly different current intensities in the said two coils for correcting small deviations from symmetry in the said device.

No references cited.